United States Patent
Ahn

(10) Patent No.: US 7,792,501 B2
(45) Date of Patent: Sep. 7, 2010

(54) APPARATUS AND METHOD FOR ATTENUATING LEAKAGE SIGNAL OF TRANSMITTER IN COMMUNICATION SYSTEM

(75) Inventor: Cheol-Woo Ahn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 580 days.

(21) Appl. No.: 11/834,078

(22) Filed: Aug. 6, 2007

(65) Prior Publication Data

US 2008/0032641 A1    Feb. 7, 2008

(30) Foreign Application Priority Data

Aug. 7, 2006    (KR) ...................... 10-2006-0074141

(51) Int. Cl.
*H04B 1/04*    (2006.01)
*H04K 3/00*    (2006.01)

(52) U.S. Cl. .................................. 455/114.1; 45/114.2

(58) Field of Classification Search ... 455/114.1–114.2; 375/296

See application file for complete search history.

(56) References Cited

U.S. PATENT DOCUMENTS 5,811,961 A * 9/1998 Daughters .................. 323/213

* cited by examiner

*Primary Examiner*—Lee Nguyen
(74) *Attorney, Agent, or Firm*—Jefferson IP Law, LLP

(57) ABSTRACT

An apparatus and method for attenuating a leakage signal of a transmitter in a communication system is provided. The apparatus includes a local oscillator, a mixer, and a leakage signal attenuator. The local oscillator outputs a reference frequency signal. The mixer adds the reference frequency signal to an IF signal to convert the IF signal into an RF signal, and outputs the RF signal, a leakage signal and an image signal. The leakage signal attenuator extracts a partial signal from the reference frequency signal output from the local oscillator, adjusts the amplitude of the extracted signal, shifts the phase of the extracted signal, and combines the resulting signal and the output signal of the mixer, to remove the leakage signal.

21 Claims, 8 Drawing Sheets

APPARATUS AND METHOD FOR ATTENUATING LEAKAGE SIGNAL OF TRANSMITTER IN COMMUNICATION SYSTEM

PRIORITY

This application claims the benefit under 35 U.S.C. §119(a) of a Korean patent application filed on Aug. 7, 2006 in the Korean Intellectual Property Office and allocated Serial No. 2006-74141, the entire disclosure of which is hereby incorporated by reference.

BACKGROUND OF THE INVENTION

1. Field of the Invention

The present invention relates generally to an apparatus and method for attenuating a leakage signal of a transmitter in a communication system. More particularly, the present invention relates to an apparatus and method for removing a leakage signal generated by an up-conversion mixer of a radio frequency (RF) transmitter, by branching a partial signal from the generated leakage signal, phase-shifting the branched partial signal, and combining the phase-shifted signal with an original signal.

2. Description of the Related Art

In a general communication system, an RF transmitter or receiver uses a direct conversion technique or a heterodyne technique. The direct conversion technique directly converts a low-frequency baseband signal and a high-frequency RF signal. The heterodyne technique converts a baseband signal or an RF signal into an intermediate frequency (IF) signal and then converts the IF signal into a signal of a desired frequency band. That is, unlike the direct conversion technique, the heterodyne technique performs an intermediate step of converting to an IF signal. Thus, compared to the direct conversion technique, the heterodyne technique can provide high signal sensitivity, selectivity and fidelity throughout a wide frequency band.

Therefore, a heterodyne technique is mainly used in most of the existing RF transmitters. The heterodyne technique uses an analog IF scheme or a digital IF scheme. The analog IF scheme converts a digital baseband signal into an analog signal using a digital-to-analog converter (DAC) and then converts the analog signal into a high-frequency RF signal by using an analog intermediate frequency. The digital IF scheme up-converts a digital baseband signal into an IF signal without converting the digital baseband signal into an analog signal. Unlike the analog IF scheme, the digital IF scheme can provide frequency conversion by digital control because it uses a digital signal.

As illustrated in FIG. 1, an RF transmitter using the heterodyne technique modulates an IF signal into an RF signal by using a mixer 101 to generate a frequency corresponding to a sum or difference of two frequencies received from a local oscillator (LO) 103 and a digital IF block 105. In an implementation, a signal isolation between ports of the mixer 101 may not have an infinite value. Thus, a leakage signal output from the LO 103 is input to the leakage signal input port as well as the RF and IF ports of the mixer 101, so that the mixer 101 generates a leakage signal 201 and an image signal 203 as well as a desired RF signal 205 as illustrated in FIG. 2. At this point, the image signal 203 is spaced apart from the leakage signal 201 by an intermediate frequency and has the same amplitude as the desired RF signal 205. The leakage signal 201 and the image signal 203 are input into a nonlinear device, which reduces the efficiency of the RF transmitter and generates an unnecessary component.

In order to remove the leakage signal 201 and the image signal 203, the RF transmitter uses an RF band-pass filter (BPF) 107 that passes only the desired RF signal 205 with a predetermined attenuation in the frequency band of the leakage signal 201 and the image signal 203 as illustrated in FIG. 2. However, as illustrated in FIG. 3A, when the RF transmitter uses a small IF signal, a leakage signal 301 and a desired RF signal 303 are near each other in terms of their frequency. In this case, the leakage signal 301 is insufficiently attenuated and the flatness characteristics in the vicinity of a pass-band boundary of the RF BPF may be degraded. In addition, as illustrated in FIG. 3B, when the RF transmitter uses a dual-band mode, a leakage signal 313 may exist between two desired RF signals 319 and 321. Thus, two or more RF BPFs must be used to remove two leakage signals 311 and 313 and two image signals 315 and 317 which increase the hardware implementation cost and the size of the RF transmitter.

SUMMARY OF THE INVENTION

An aspect of the present invention is to address at least the above problems and/or disadvantages and to provide at least the advantages described below. Accordingly, an aspect of the present invention is to provide an apparatus and method for attenuating a leakage signal of a transmitter in a communication system.

Another aspect of the present invention is to provide an apparatus and method for attenuating a leakage signal generated by an up-conversion mixer in an RF transmitter by using a phase shifting technique.

Still another aspect of the present invention is to provide an apparatus and method for attenuating a leakage signal generated in an RF transmitter, thereby enhancing performance while reducing the hardware implementation costs.

According to an aspect of the present invention, an apparatus for attenuating a leakage signal of an RF transmitter is provided. The apparatus includes a local oscillator for outputting a reference frequency signal, a mixer for adding the reference frequency signal to an IF signal to convert the IF signal into an RF signal and for outputting the RF signal, a leakage signal and an image signal, and a leakage signal attenuator for extracting a partial signal from the reference frequency signal output from the local oscillator, for adjusting the amplitude of the extracted signal, for shifting the phase of the extracted signal and for combining the resulting signal with the output signal of the mixer to remove the leakage signal.

According to another aspect of the present invention, a method for attenuating a leakage signal of an RF transmitter is provided. The method includes outputting a reference frequency signal when an IF signal is output from an IF block, converting the IF signal into an RF signal by using the reference frequency signal, outputting the RF signal, extracting a partial signal from the reference frequency signal, adjusting the amplitude of the extracted signal, shifting the phase of the extracted signal, and combining the RF signal with the phase-shifted signal to remove the leakage signal.

BRIEF DESCRIPTION OF THE DRAWINGS

The above and other objects, features and advantages of certain exemplary embodiments of the present invention will become more apparent from the following detailed description when taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of the exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The present invention is to provide an apparatus and method for removing a leakage signal generated by an up-conversion mixer of an RF transmitter in a communication system by branching a partial signal from the generated leakage signal, phase-shifting the branched partial signal and combining the phase-shifted signal and an original signal.

Figure 1:
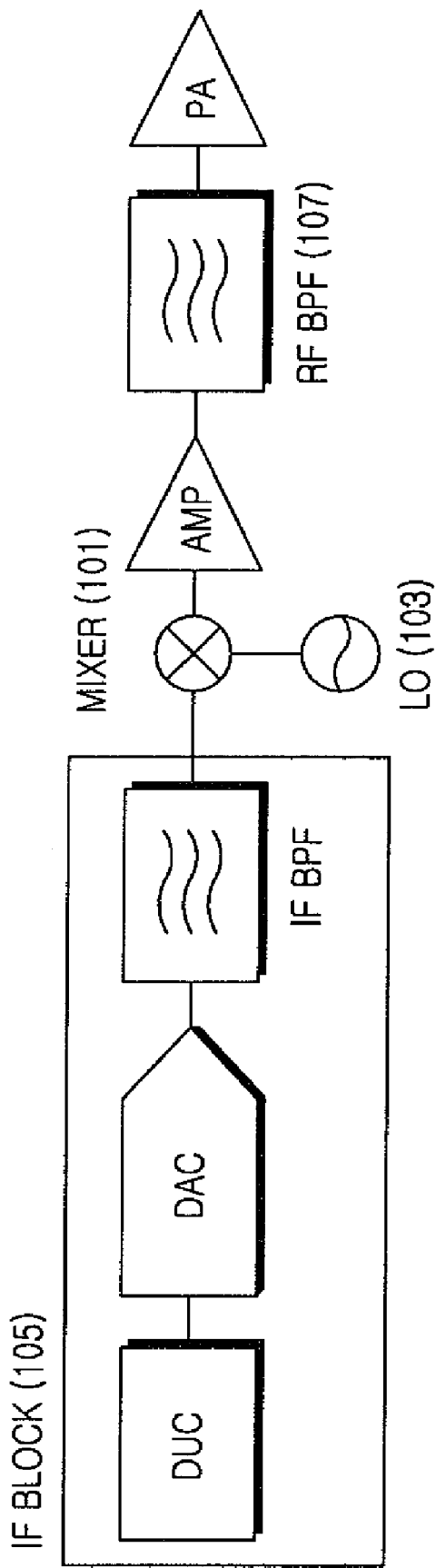
FIG. 1 is a diagram illustrating the structure of a conventional RF transmitter in a communication system.
Figure 2:
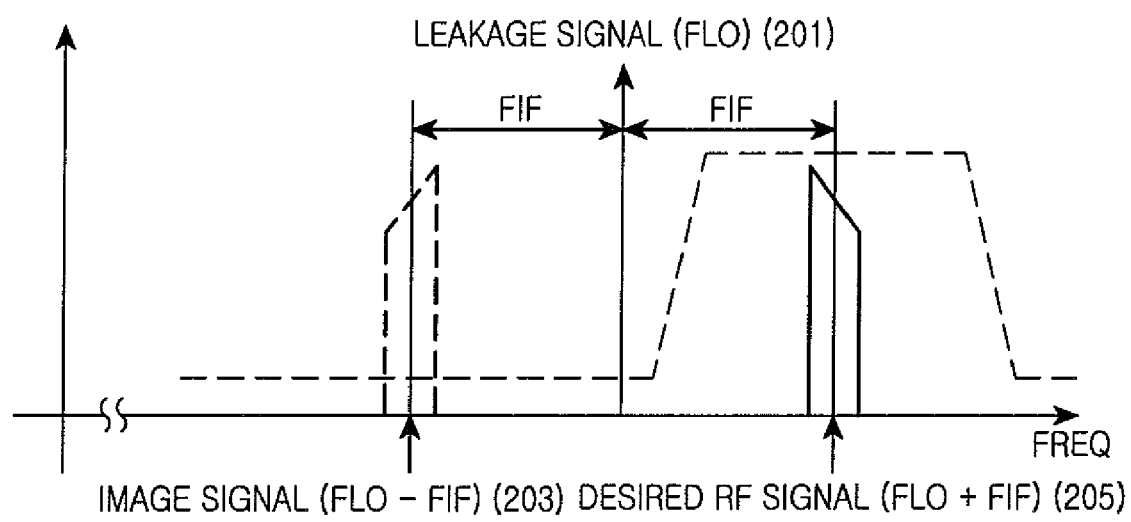
FIG. 2 is a diagram illustrating a conventional method for removing a leakage signal and an image signal in the conventional RF transmitter.
Figure 3A:
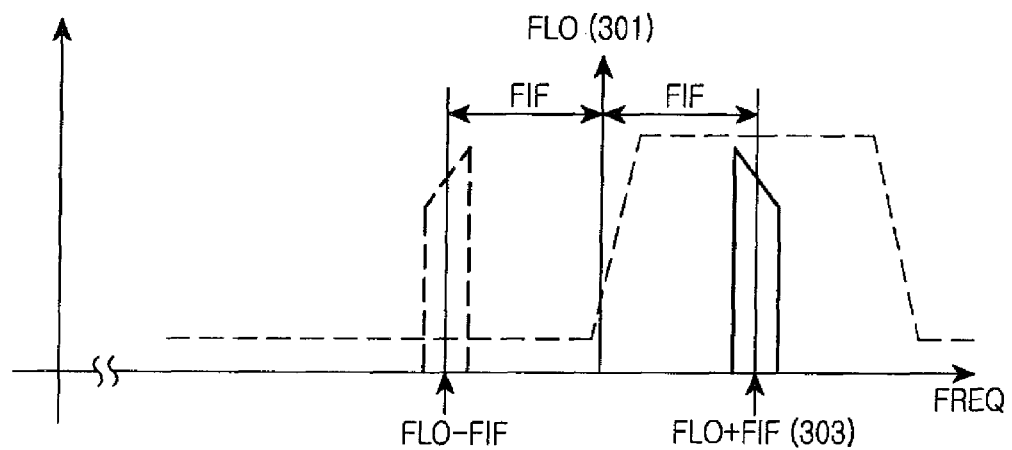
FIGS. 3A and 3B are diagrams illustrating the limitations of the conventional method for removing a leakage signal and an image signal in the conventional RF transmitter.
Figure 3B:
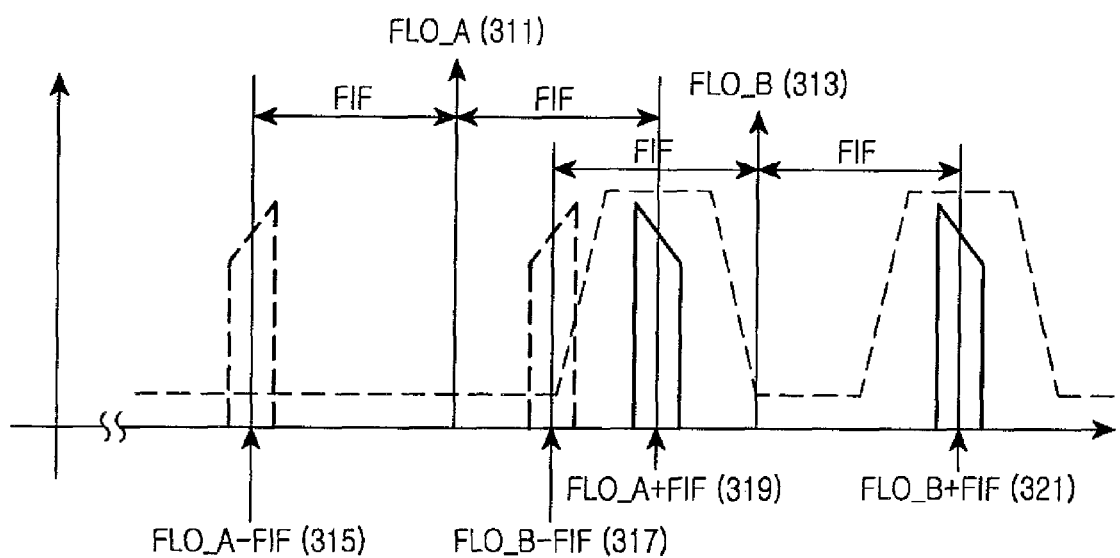
Figure 4:
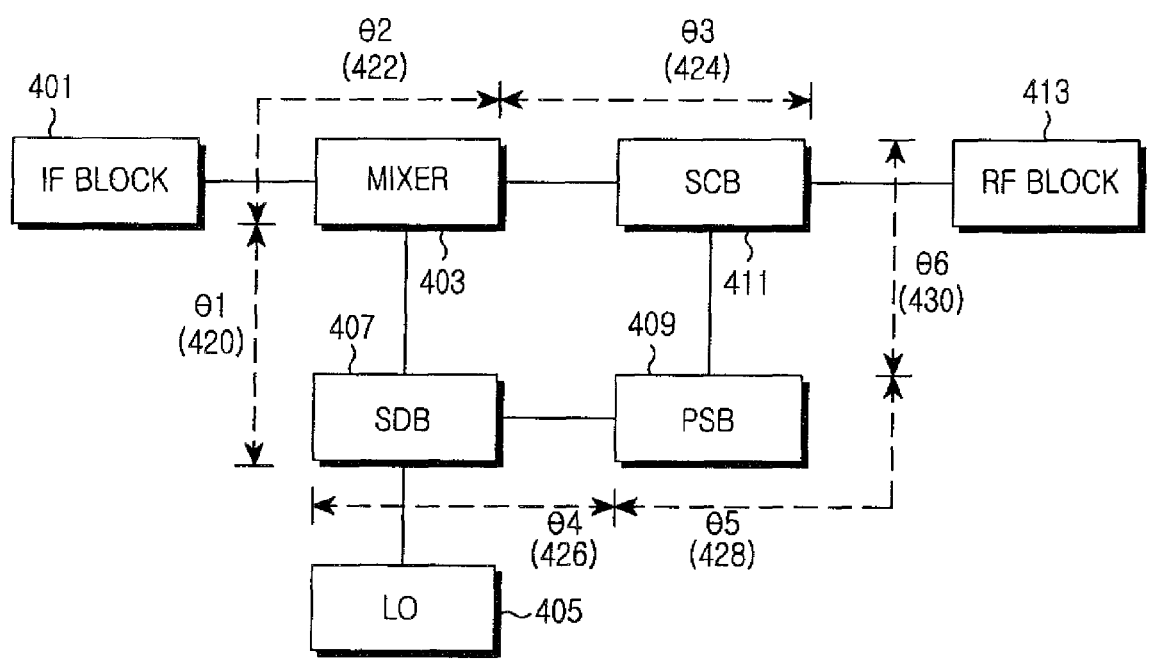
FIG. 4 is a block diagram illustrating an RF transmitter for attenuating a leakage signal in a communication system according to an exemplary embodiment of the present invention.

FIG. 4 is a block diagram illustrating an RF transmitter for attenuating a leakage signal in a communication system according to an exemplary embodiment of the present invention.

Referring to FIG. 4, the RF transmitter includes an IF block (IFB) 401, a mixer 403, a local oscillator (LO) 405, a signal dividing block (SDB) 407, a phase shift block (PSB) 409, a signal combining block (SCB) 411, and an RF block 413.

The IF block 401 converts a baseband frequency signal, for example a signal including voices, data or pictures to be transmitted, into an IF signal and outputs the IF signal.

In general, the mixer 403 converts a high-frequency signal into a low-frequency signal and converts a low-frequency signal into a high-frequency signal. In particular, according to an exemplary embodiment of the present invention, the mixer 403 adds a local oscillation signal, which is a reference frequency signal received from the SDB 407, to the IF signal received from the IF block 401 to convert the IF signal into an RF signal. When outputting the RF signal, the mixer 403 outputs a leakage signal of the local oscillation signal received from the SDB 407 and generates and outputs an image signal of the RF signal, which is spaced apart from the leakage signal by the IF in the opposite direction of the RF signal.

The LO 405 operates to output the local oscillation signal (i.e., the reference frequency signal) that is used for the frequency conversion in the mixer 403.

The SDB 407 extracts a partial signal from the local oscillation signal and outputs the extracted signal to the PSB 409. The SDB 407 may extract the partial signal from the local oscillation signal by using a divider that divides an input signal into signals of the same amplitude. Alternatively, the SDB 407 may extract the partial signal by using a coupler that has a predetermined coupling ratio and couples only partial power that is very small so as not to affect an original signal.

Figure 5:
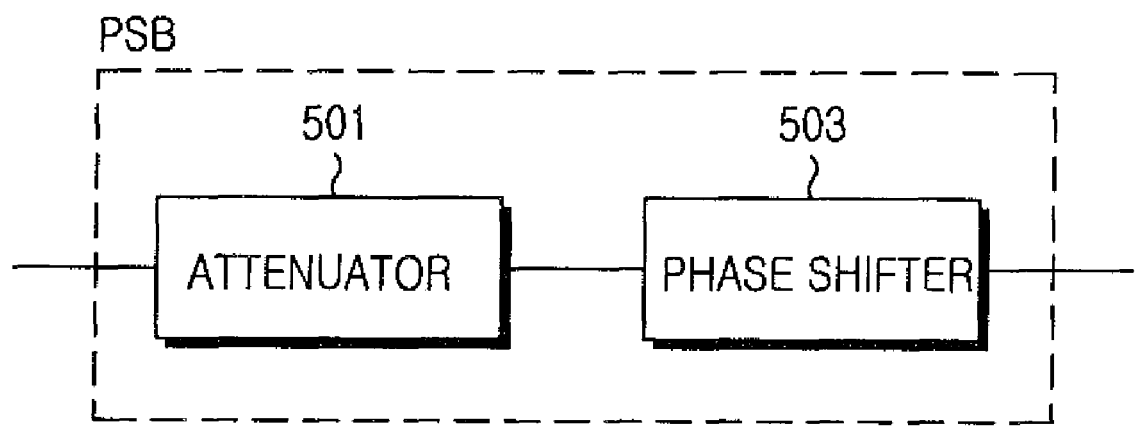
FIG. 5 is a block diagram illustrating a phase shifter in the RF transmitter illustrated in FIG. 4.

The PSB 409 receives a signal extracted from the leakage signal from the SDB 407, adjusts the amplitude of the extracted signal so that the extracted signal has the same amplitude as the leakage signal, and shifts the phase of the extracted signal so that the extracted signal is combined with the leakage signal in the SCB 411 with a 180°-inverted phase. That is, as illustrated in FIG. 5, the PSB 409 includes an attenuator 501 and a phase shifter 503. The PSB 409 adjusts the amplitude of the extracted signal using the attenuator 501 and shifts the phase of the amplitude-adjusted signal using the phase shifter 503. Herein, both the leakage signal and the extracted signal can be phase-shifted until they are transferred from the SDB 407 through the mixer 403 or the PSB 409 to the SCB 411. Therefore, the phase shifter 503 must shift the phase of the extracted signal in consideration of the phase of a signal that is shifted through each block of the RF transmitter. That is, the phase shifter 503 shifts the phase of the extracted signal so that the phase shift of the extracted signal has a 180° phase difference from the phase shift of the leakage signal as shown in Equation (1):

$$\theta = \theta' + 180 \quad (1)$$

where $\theta$ denotes the phase shift of the extracted signal and $\theta'$ denotes the phase shift of the leakage signal.

Referring again to FIG. 4, the phase shift $\theta$ of the extracted signal is the sum of a phase shift $\theta 4$ 426 between the SDB 407 and the PSB 409, a phase shift $\theta 5$ 428 in the PSB 409, and a phase shift $\theta 6$ 430 between the PSB 409 and the SCB 411. The phase shift $\theta'$ of the leakage signal is a sum of a phase shift $\theta 1$ 420 between the SDB 407 and the mixer 403, a phase shift $\theta 2$ 422 due to an internal delay of the mixer 403, and a phase shift $\theta 3$ 424 between the mixer 403 and the SCB 411. Because all the phase shifts except the phase shift $\theta 5$ 428 are measurable, Equation (1) can be transformed into Equation (2):

$$\theta 5 = \theta 1 + \theta 2 + \theta 3 - (\theta 4 + \theta 6) + 180 \quad (2)$$

Figure 7A:
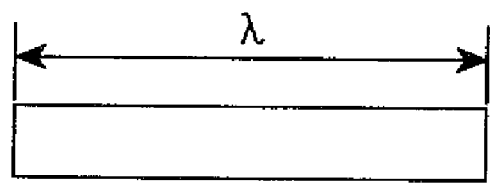
FIGS. 7A and 7B are diagrams illustrating a detailed structure of the phase shifter in the RF transmitter according to an exemplary embodiment of the present invention.
Figure 7B:
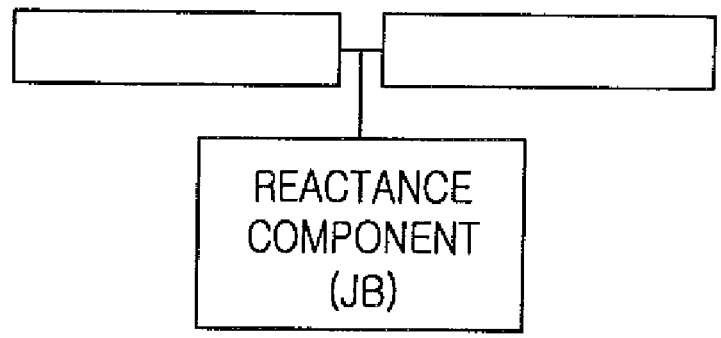
Figure 7B:
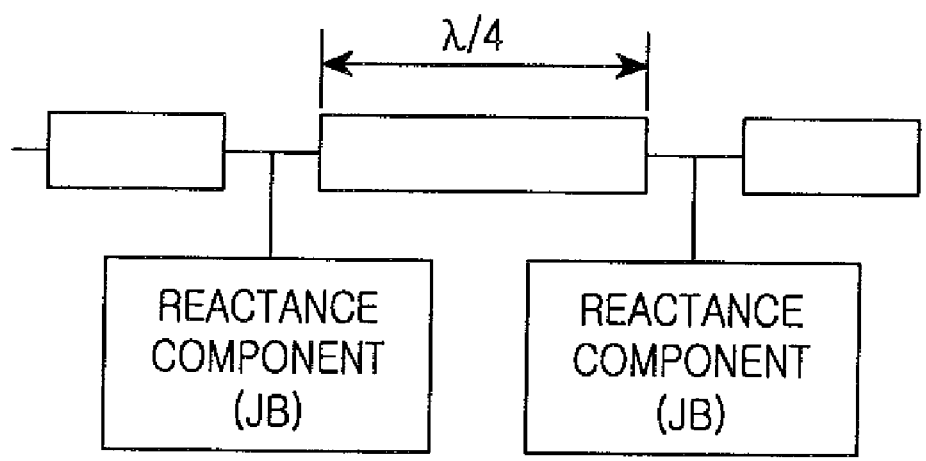

As shown in Equation (2), the PSB 409 shifts the phase of a signal received from the SDB 407 by the phase shift $\theta 5$ 428, thereby attenuating the leakage signal in the SCB 411. Thus, the phase shifter 503 in the PSB 409 is designed to shift a signal phase by a difference between the phase shift $\theta 5$ 428 in the PSB 409 and a phase shift in the attenuator 501. The phase shifter 503 can be implemented in various ways. For example, as illustrated in FIG. 7A, the phase shifter 503 may be implemented using a transmission line. When the phase shifter 503 is implemented using an RF 50Ω transmission line, a 180° phase shift can be made using $\lambda/2$. The way to implement the phase shifter 503 using a transmission line is simple, but it is difficult in terms of tuning. However, as illustrated in FIG. 7B, the phase shifter 503 may be implemented by using a combination of transmission lines and one or more reactance components to make a phase shift in a mismatching scheme based on signal reflection. The reactance component can be implemented using L, C, open/short stubs, and the like, which enables precise tuning for the phase shift.

Figure 6:
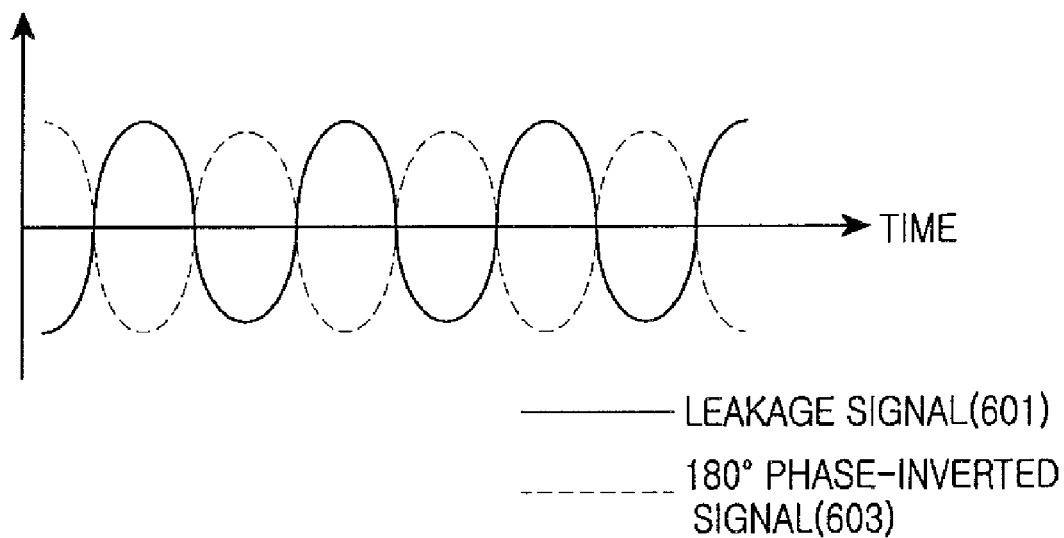
FIG. 6 is a diagram illustrating a method for attenuating a leakage signal in a communication system according to an exemplary embodiment of the present invention.

The SCB 411 combines a signal received from the mixer 403 and a phase-shifted signal output from the PSB 409, thereby attenuating the leakage signal of the signal received from the mixer 403. That is, as illustrated in FIG. 6, the SCB 411 adds a leakage signal 601 and a 180° phase-inverted signal 603 having the same amplitude as the leakage signal 601, thereby removing the leakage signal 601. The SCB 411 may combine the two signals using a combiner or a coupler.

The RF block 413 receives signal with the leakage signal removed from the SCB 411, converts the received signal into an RF signal, and amplifies the RF signal to a high power level prior to transmission through an antenna.

Figure 8:
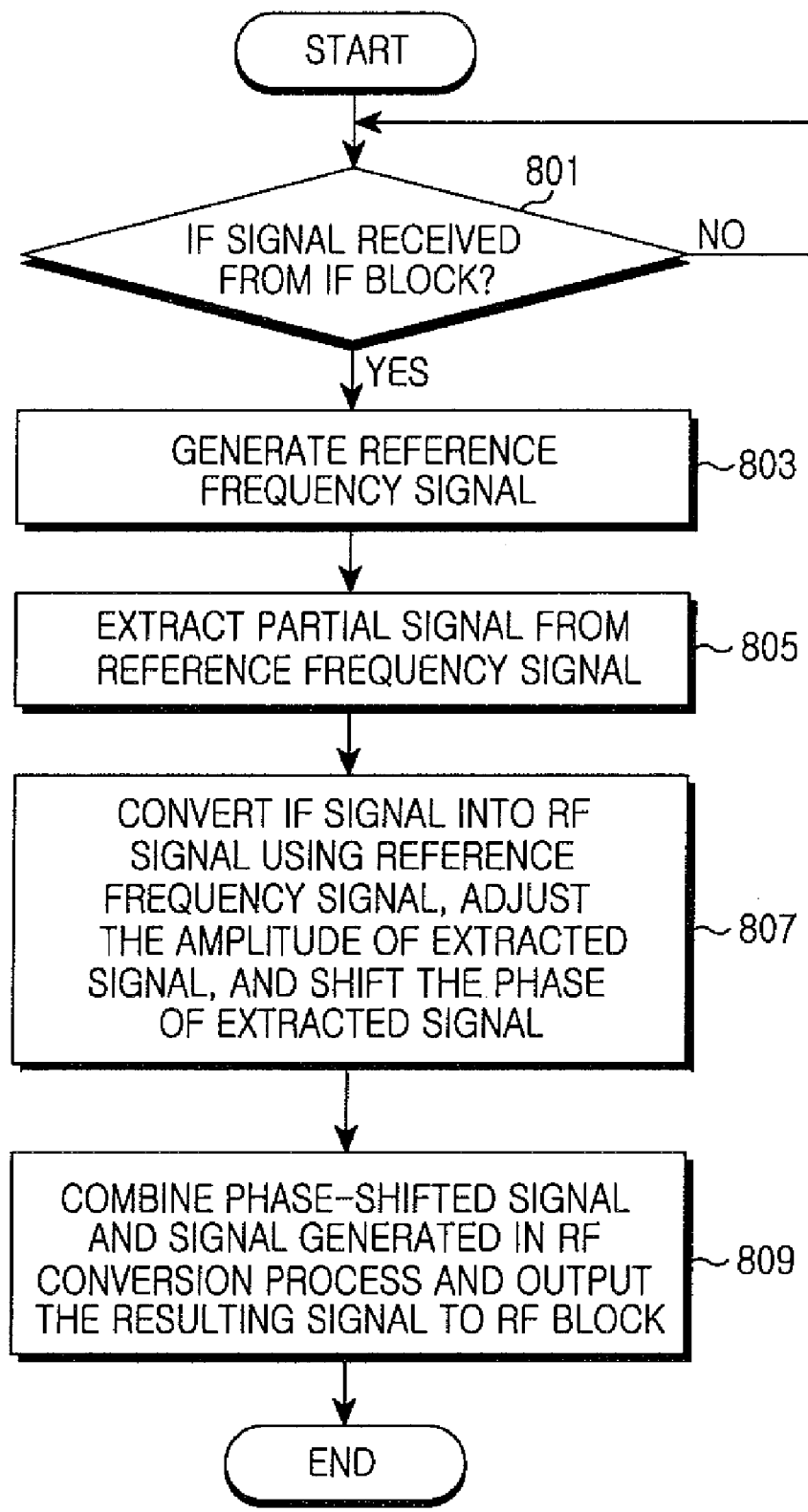
FIG. 8 is a flow diagram illustrating a procedure for attenuating a leakage signal in an RF transmitter of a communication system according to an exemplary embodiment of the present invention.

FIG. 8 is a flow diagram illustrating a procedure for attenuating the leakage signal in the RF transmitter of a communication system according to an exemplary embodiment of the present invention.

Referring to FIG. 8, in step 801, the RF transmitter determines whether an IF signal, which is converted from a baseband frequency signal expressing voices, data or pictures to be transmitted, is received from an IF block. If the IF signal is not received, step 801 is repeated. If the IF signal is received, the procedure proceeds to step 803. In step 803, the RF transmitter generates a local oscillation signal (i.e., a reference frequency signal) for converting the IF signal into an RF signal. In step 805, the RF transmitter extracts a partial signal from the local oscillation signal. In an exemplary embodiment, the partial signal may be extracted by using a divider that divides an input signal into signals of the same amplitude, or by using a coupler that couples only very small partial power with a predetermined coupling ratio.

In step 807, the RF transmitter converts the IF signal into an RF signal by adding the local oscillation signal to the IF signal, adjusts the amplitude of the extracted partial signal, and shifts the phase of the extracted partial signal. At this point, a leakage signal of the local oscillation signal and an image signal of the RF signal are generated together with the high-frequency RF signal, and the image signal is spaced apart from the leakage signal by the IF in the opposite direction of the RF signal. In addition, the amplitude of the extracted partial signal is adjusted to be substantially identical to the amplitude of the leakage signal, and the phase of the extracted partial signal is shifted by a predetermined phase shift so that the partial signal is combined with the leakage signal with a 180° phase difference.

In step 809, the RF transmitter removes a leakage signal by combining the amplitude-adjusted and phase-shifted signal with a signal generated in the RF conversion process, and outputs the leakage signal removed signal to an RF block. That is, as illustrated in FIG. 6, a leakage signal 601 generated in the RF conversion process and a 180° phase-inverted signal 603 having the same amplitude as the leakage signal 601 are added to remove the leakage signal 601. The two signals (i.e., the amplitude-adjusted and phase-shifted signal and the signal generated in the RF conversion process) may be combined by using a combiner or a coupler.

Thereafter, the RF transmitter ends the procedure.

As described above, certain exemplary embodiments of the present invention branch a partial signal from a leakage signal generated in an RF transmitter of a communication system, phase-shift the branched partial signal, and combine the phase-shifted signal and an original signal, thereby removing the leakage signal. Accordingly, it is possible to increase the flatness in the pass band of the RF BPF, to reduce the number of the BPFs used, and to reduce the hardware implementation costs.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for attenuating a leakage signal of a radio frequency (RF) transmitter, the apparatus comprising:
   a local oscillator for outputting a reference frequency signal;
   a mixer for adding the reference frequency signal to an intermediate frequency (IF) signal to convert the IF signal into an RF signal, and for outputting the RF signal, a leakage signal and an image signal; and
   a leakage signal attenuator including a signal dividing block for extracting a partial signal from the reference frequency signal output from the local oscillator, a phase shift block for adjusting the amplitude of the extracted signal and for shifting the phase of the extracted signal, and a signal combining block for combining an output signal of the phase shift block and the output signal of the mixer to remove the leakage signal,
   wherein the phase of the extracted signal is shifted by an amount corresponding to the addition of 180° to a resulting value of a difference between a phase shift of the extracted signal from the signal dividing block to the phase shift block and a phase shift of the extracted signal from the phase shift block to the signal combining block from a phase shift of the reference frequency signal throughout the signal dividing block, the mixer and the signal combining block.

2. The apparatus of claim 1, wherein the amplitude of the extracted signal is adjusted and the phase of the extracted signal is shifted by a predetermined phase shift such that the extracted signal has the same amplitude as the leakage signal and has a 180° phase difference from the leakage signal.

3. The apparatus of claim 2, wherein the phase shift block comprises:
   an attenuator for adjusting the amplitude of the extracted signal to the amplitude of the leakage signal; and
   a phase shifter for shifting the phase of the extracted signal by a difference between the predetermined phase shift and a phase shift in the attenuator.

4. The apparatus of claim 3, wherein the phase shifter shifts the phase of the extracted signal by the predetermined phase shift by using one or more transmission lines.

5. The apparatus of claim 3, wherein the phase shifter shifts the phase of the extracted signal by the predetermined phase shift by using a combination of transmission lines and one or more reactance components.

6. The apparatus of claim 1, wherein the signal dividing block extracts a desired signal by using a divider that divides an input signal into signals of the same amplitude.

7. The apparatus of claim 1, wherein the signal dividing block extracts a desired signal by using a coupler with a predetermined coupling ratio.

8. The apparatus of claim 1, wherein the signal combining block combines two signals by using a combiner.

9. The apparatus of claim 1, wherein the signal combining block combines two signals by using a coupler.

10. An apparatus for attenuating a leakage signal of a radio frequency (RF) transmitter, the apparatus comprising:
- a local oscillator for outputting a reference frequency signal;
- a mixer for adding the reference frequency signal to an intermediate frequency (IF) signal to convert the IF signal into an RF signal, and for outputting the RF signal, a leakage signal and an image signal; and
- a leakage signal attenuator for extracting a partial signal from the reference frequency signal output from the local oscillator, for adjusting the amplitude of the extracted signal, for shifting the phase of the extracted signal, and for combining the amplitude adjusted phase shifted extracted signal and the output signal of the mixer to remove the leakage signal,
- wherein the leakage signal attenuator comprises:
  - a signal dividing block for extracting the partial signal from the reference frequency signal output from the local oscillator,
  - a phase shift block for adjusting the amplitude of the extracted signal and for shifting the phase of the extracted signal by a predetermined phase shift such that the extracted signal has the same amplitude as the leakage signal and has a 180° phase difference from the leakage signal, and
  - a signal combining block for combining the output signal of the mixer and the output signal of the phase shift block,
  - wherein the predetermined phase shift is calculated by subtracting a phase shift of the extracted signal from the signal dividing block to the phase shift block and a phase shift of the extracted signal from the phase shift block to the signal combining block from a phase shift of the reference frequency signal throughout the signal dividing block, the mixer and the signal combining block, and adding the resulting value and 180°.

11. A method for attenuating a leakage signal of a radio frequency (RF) transmitter, the method comprising:
- outputting a reference frequency signal when an intermediate frequency (IF) signal is output from an IF block;
- converting the IF signal into an RF signal by using the reference frequency signal;
- outputting the RF signal;
- extracting a partial signal from the reference frequency signal;
- adjusting the amplitude of the extracted signal;
- shifting the phase of the extracted signal; and
- combining the RF signal and the amplitude adjusted phase-shifted extracted signal to remove the leakage signal,
- wherein an amount of said shift of the phase of the extracted signal is calculated by subtracting a phase shift of the extracted signal from a signal dividing block to a phase shift block and a phase shift of the extracted signal from the phase shift block to a signal combining block from a phase shift of the reference frequency signal throughout the signal dividing block, a mixer and the signal combining block, and adding the resulting value and 180°.

12. The method of claim 11, wherein the RF signal comprises at least one of an RF signal, a leakage signal and an image signal.

13. The method of claim 11, wherein the extracting of the partial signal comprises extracting a partial signal by using a divider that divides an input signal into signals of the same amplitude.

14. The method of claim 11, wherein the extracting of the partial signal comprises extracting a partial signal by using a coupler with a predetermined coupling ratio.

15. The method of claim 11, wherein the adjusting of the amplitude of the extracted signal comprises adjusting the amplitude of the extracted signal such that the extracted signal has the same amplitude as a leakage signal included in the RF signal.

16. The method of claim 11, wherein the shifting of the phase of the extracted signal comprises shifting the phase of the extracted signal by a predetermined phase shift such that the extracted signal has a 180° phase difference from the leakage signal.

17. The method of claim 11, wherein the shifting of the phase of the extracted signal comprises shifting the phase of the extracted signal by a predetermined phase shift by using one or more transmission lines.

18. The method of claim 11, wherein the shifting of the phase of the extracted signal comprises shifting the phase of the extracted signal by a predetermined phase shift by using a combination of transmission lines and one or more reactance components.

19. The method of claim 11, wherein the combining of the RF signal and the amplitude adjusted phase-shifted extracted signal comprises combining the RF signal and the amplitude adjusted phase-shifted extracted signal by using a combiner.

20. The method of claim 11, wherein the combining of the RF signal and the amplitude adjusted phase-shifted extracted signal comprises combining the RF signal and the amplitude adjusted phase-shifted extracted signal by using a coupler.

21. A method for attenuating a leakage signal of a radio frequency (RF) transmitter, the method comprising:
- outputting a reference frequency signal when an intermediate frequency (IF) signal is output from an IF block;
- converting the IF signal into an RF signal by using the reference frequency signal;
- outputting the RF signal;
- extracting a partial signal from the reference frequency signal;
- adjusting the amplitude of the extracted signal;
- shifting the phase of the extracted signal; and
- combining the RF signal and the amplitude adjusted phase-shifted extracted signal to remove the leakage signal,
- wherein the extracting of the partial signal comprises extracting the partial signal from the reference frequency signal output from a local oscillator by a signal dividing block,
- wherein the adjusting of the amplitude of the extracted signal comprises adjusting the amplitude of the extracted signal such that the extracted signal has the same amplitude as a leakage signal by a phase shift block,
- wherein the shifting of the phase of the extracted signal comprises shifting the phase of the extracted signal by a predetermined phase shift such that the extracted signal has a 180° phase difference from the leakage signal by the phase shift block,
- wherein the combining of the RF signal and the amplitude adjusted phase-shifted extracted signal comprises combining the RF signal output from a mixer and the output signal of the phase shift block by a signal combining block, and
- wherein the predetermined phase shift is calculated by subtracting a phase shift of the extracted signal from the signal dividing block to the phase shift block and a phase shift of the extracted signal from the phase shift block to the signal combining block from a phase shift of the reference frequency signal throughout the signal dividing block, the mixer and the signal combining block, and adding the resulting value and 180°.

* * * * *